(12) United States Patent
Kim et al.

(10) Patent No.: US 11,988,779 B2
(45) Date of Patent: May 21, 2024

(54) READOUT ARCHITECTURE FOR FMCW LIDAR

(71) Applicant: SAMSUNG ELECTRONICS CO., LTD., Suwon-si (KR)

(72) Inventors: Kwang Oh Kim, Cerritos, CA (US); Yibing Michelle Wang, Temple City, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 862 days.

(21) Appl. No.: 17/011,813

(22) Filed: Sep. 3, 2020

(65) Prior Publication Data

US 2022/0018945 A1 Jan. 20, 2022

Related U.S. Application Data

(60) Provisional application No. 63/051,542, filed on Jul. 14, 2020.

(51) Int. Cl.
*G01S 7/4915* (2020.01)
*G01S 7/481* (2006.01)
(Continued)

(52) U.S. Cl.
CPC .......... *G01S 7/4915* (2013.01); *G01S 7/4816* (2013.01); *G01S 7/4817* (2013.01); *G01S 17/06* (2013.01); *G01S 17/58* (2013.01)

(58) Field of Classification Search
CPC ...... G01S 7/4915; G01S 17/58; G01S 7/4817; G01S 17/06; G01S 7/4816; G01S 7/4913;
(Continued)

(56) References Cited

U.S. PATENT DOCUMENTS 5,563,701 A * 10/1996 Cho .................. G01S 17/10
356/5.15
7,986,397 B1 7/2011 Tiemann et al.
(Continued)

OTHER PUBLICATIONS

"Phase-locked loop," Wikipedia, 2023. retrieved from https://en.wikipedia.org/w/ondex.php?title=Phase-locked_loop&oldid=1169133481, 11 pages. (Year: 2023).*

(Continued)

*Primary Examiner* — Daniel L Murphy
(74) *Attorney, Agent, or Firm* — Lewis Roca Rothgerber Christie LLP

(57) ABSTRACT

Provided is a readout integrated circuit of a FMCW LiDAR system includes a transimpedance amplifier to receive an optical signal of optical mixer output from balanced PIN photo diode, convert the received optical signal into a current signal including a mixed signal of high and low frequencies, and convert the current signal into a voltage signal including a low frequency sinusoidal waveform, a comparator to receive the voltage signal, and generate a pulse signal from the voltage signal, a primary counter to receive a primary signal corresponding to the pulse signal, and count a number of pulses to generate primary counter data, a reference counter to receive a reference signal, and count a number of pulses to generate reference counter data, and an arithmetic logic unit to receive the primary and reference counter data, and calculate depth information corresponding to a distance of a target.

19 Claims, 5 Drawing Sheets

(51) Int. Cl.
*G01S 17/06* (2006.01)
*G01S 17/58* (2006.01)

(58) Field of Classification Search
CPC ...... G01S 17/931; G01S 17/34; G01S 7/4861; G01S 7/481; G01S 17/08
USPC ...................................................... 356/4.01
See application file for complete search history.

(56) References Cited

U.S. PATENT DOCUMENTS

| | | | |
|---|---|---|---|
| 10,401,480 | B1 | 9/2019 | Gaalema et al. |
| 11,002,857 | B2 * | 5/2021 | Dussan ................. G01S 7/4817 |
| 2006/0050352 | A1 | 3/2006 | Schwarte |
| 2019/0391243 | A1 | 12/2019 | Nicolaescu |

OTHER PUBLICATIONS

Behroozpour et al., "Electronic-Photonic Integrated Circuit for 3D Microimaging," IEEE Journal of Solid-State Circuits, vol. 52, No. 1, Jan. 2017, 12 pages (Year: 2017).*

Kim, et al., Optimal Spectral Estimation and System Trade-Off in Long-Distance Frequency-Modulated Continuous-Wave LIDAR, Department of Electrical Engineering and Computer Sciences, University of California, Berkeley, USA, @2018 IEEE, pp. 1583-1587.

Hwang, et al., Study on the Frequency-Modulated Continuous-Wave LiDAR Mutual Interference, @2019 IEEE 19$^{th}$ International Conference on Communication Technology, pp. 1053-1056.

* cited by examiner

READOUT ARCHITECTURE FOR FMCW LIDAR

CROSS-REFERENCE TO RELATED APPLICATION(S)

This application claims priority to, and the benefit of, U.S. Provisional Application Ser. No. 63/051,542, filed on Jul. 14, 2020, entitled "A Novel Readout Architecture for the FMCW LiDAR," the entire contents of which is incorporated herein by reference.

FIELD

One or more aspects of embodiments of the present disclosure relate generally to LiDAR systems.

BACKGROUND

LiDAR is a portmanteau of light and radar and may refer to "light detection and ranging" or "laser imaging, detection, and ranging," and refers to a method for measuring distances and/or velocity of a target or object by illuminating the target with light (e.g., laser light) from one or more sources, and by measuring a reflection of the light off of the target with one or more sensors.

For example, differences in return times (e.g., an amount of time between emission of the light and detection of the reflection of portions of the light) and/or differences in wavelengths (e.g., a difference between a wavelength of emitted laser light and a wavelength of the detected reflected laser light) may be used to determine a distance of the target (e.g., a distance from the light source or the sensor to the target), and may also be used to make a digital 3-dimensional representation of one or more portions of the target that reflect the light.

The above information disclosed in this Background section is only for enhancement of understanding of the background of the disclosure, and therefore may contain information that does not form the prior art.

SUMMARY

Embodiments described herein provide improvements in LiDAR technology, including improvements to a readout architecture, which includes a readout integrated chip, that is used in frequency-modulated continuous wave (FMCW) LiDAR systems.

According to embodiments of the present disclosure, there is provided a readout integrated circuit of a FMCW LiDAR system, the readout integrated circuit including a transimpedance amplifier configured to receive an optical signal of optical mixer output from a balanced PIN photo diode, convert the received optical signal of optical mixer output into a current signal including a mixed signal of high and low frequencies, and convert the current signal into a voltage signal including a low frequency sinusoidal waveform after filtering a high frequency, a comparator configured to receive the voltage signal from the transimpedance amplifier, and generate a pulse signal from the voltage signal, a primary counter configured to receive a primary signal corresponding to the pulse signal generated by the comparator, and count a number of pulses of the primary signal during a certain time period to generate primary counter data, a reference counter configured to receive a reference signal, and count a number of pulses of the reference signal during a time period to generate reference counter data, and an arithmetic logic unit configured to receive the primary counter data and the reference counter data, and calculate depth information corresponding to a distance of a target based on the primary counter data and the reference counter data.

The readout integrated circuit may further include a primary phase-locked loop (PLL) configured to receive the pulse signal from the comparator, and multiply a frequency of the pulse signal to generate the primary signal, and a reference phase-locked loop configured to amplify a reference PLL signal to generate the reference signal having a reference frequency corresponding to a reference distance.

The comparator may be further configured to compare the primary signal and the reference signal.

The arithmetic logic unit may be configured to calculate the depth information by multiplying the reference distance by a ratio of the reference counter data to the primary counter data.

The readout integrated circuit may further include a frame memory configured to receive the primary counter data, and receive the depth information, or velocity information, from the arithmetic logic unit.

The arithmetic logic unit may be further configured to calculate velocity information by receiving, from the frame memory, the depth information, the depth information including a first depth information calculated for a first memory frame and a second depth information calculated for a second memory frame, calculating a difference of depth corresponding to a difference between the first depth information and the second depth information, and dividing the difference of depth by a time period corresponding to a time between the first memory frame and the second memory frame.

The comparator may be further configured to compare the primary counter data and the reference counter data.

According other embodiments of the present disclosure, there is provided a method to determine a distance or a velocity of an object, the method including receiving a waveform signal corresponding to a target, generating a pulse signal from the received waveform signal, resetting a primary counter and a reference counter, beginning a primary count with the primary counter and a reference count with the reference counter after a first time period since the resetting of the primary counter and the reference counter has elapsed, continuing the primary count and the reference count for a second time period, retaining a last primary value of the primary counter and a last reference value of the reference counter, calculating a ratio of the last primary value to the last reference value, and multiplying a reference distance by the ratio.

The method may further include receiving the waveform signal from an optical mixer output.

The first time period may correspond to a detection range.

The second time period may correspond to a flexible programmed time period.

The method may further include generating a beam toward the target to cause the target to scatter the beam, and receiving the scattered beam as the waveform signal corresponding to the target.

The method may further include calculating velocity information by receiving depth information including a first depth information calculated for a first memory frame and a second depth information calculated for a second memory frame, calculating a difference of depth corresponding to a difference between the first depth information and the second depth information, and dividing the difference of depth by a time period corresponding to a time between the first memory frame and the second memory frame.

The method may further include calculating the depth information by multiplying the reference distance by a ratio of the reference count to the primary count.

According to yet other embodiments of the present disclosure, there is provided a non-transitory computer readable medium implemented on a readout integrated circuit of a FMCW LiDAR system, the non-transitory computer readable medium having computer code that, when executed on a processor, implements a method of determining a distance or a velocity of an object, the method including receiving a waveform signal corresponding to a target, generating a pulse signal from the received waveform signal, resetting a primary counter and a reference counter, beginning a primary count with the primary counter and a reference count with the reference counter after a first time period since the resetting has elapsed, continuing the primary count and the reference count for a second time period, retaining a last primary value of the primary counter and a last reference value of the reference counter, calculating a ratio of the last primary value to the last reference value, and multiplying a reference distance by the ratio.

The computer code, when executed on the processor, may further implement the method of determining the distance or the velocity of the object by receiving the waveform signal from an optical mixer output.

The first time period may correspond to a detection range, wherein the second time period corresponds to a flexible programmed time period.

The computer code, when executed on the processor, may further implement the method of determining the distance or the velocity of the object by generating a beam toward the target to cause the target to scatter the beam, and receiving the scattered beam as the waveform signal corresponding to the target.

The computer code, when executed on the processor, may further implement the method of determining the distance or the velocity of the object by calculating velocity information by receiving depth information including a first depth information calculated for a first memory frame and a second depth information calculated for a second memory frame, calculating a difference of depth corresponding to a difference between the first depth information and the second depth information, and dividing the difference of depth by a time period corresponding to a time between the first memory frame and the second memory frame.

The computer code, when executed on the processor, may further implement the method of determining the distance or the velocity of the object by calculating the depth information by multiplying the reference distance by a ratio of the reference counter output data to the primary counter output data.

Accordingly, the system and method of some embodiments of the present disclosure are able to calculate a range of a target while omitting circuit elements used to perform transforms to process signals in calculating depth/distance/range.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

Figure 1:
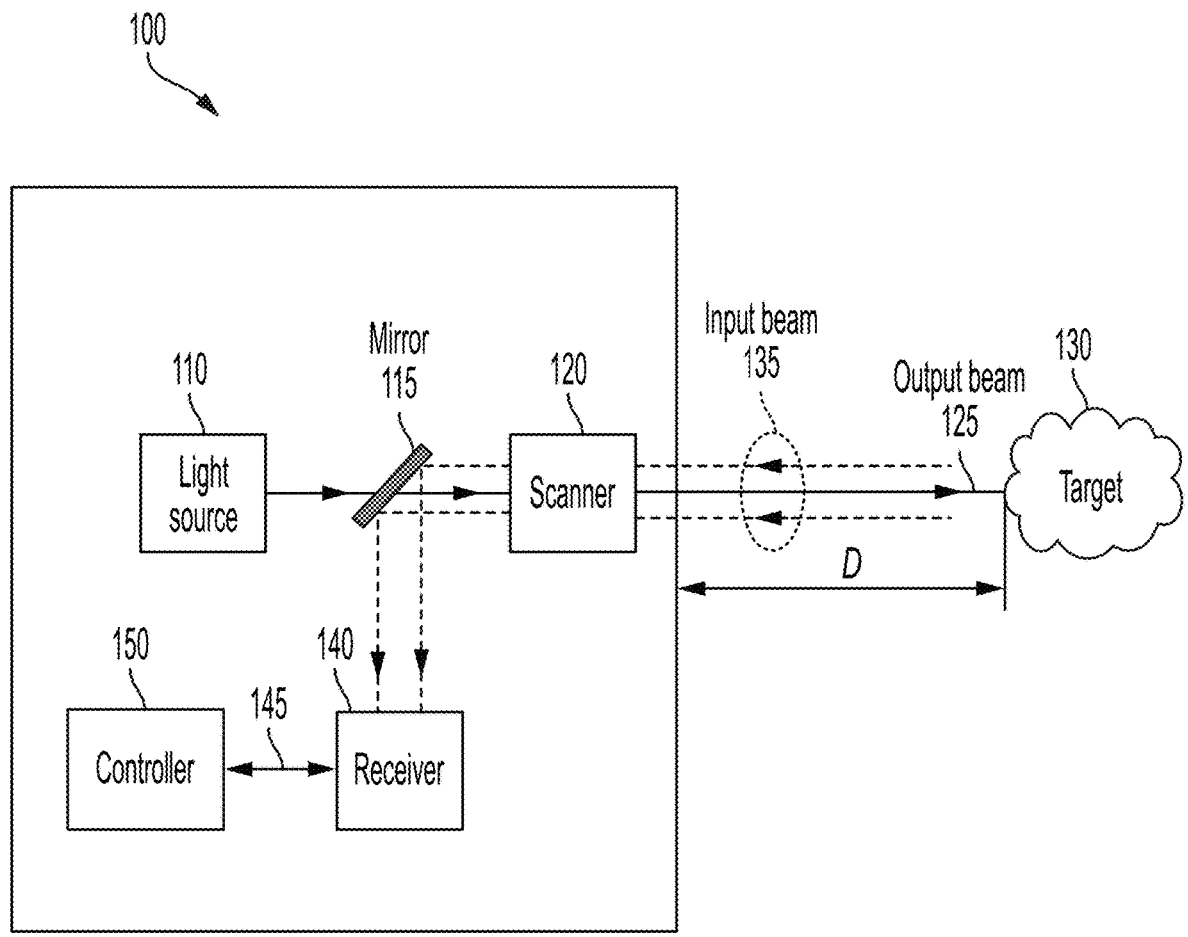
FIG. 1 shows a block diagram depicting a LiDAR system, according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing some embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, a LiDAR system may be used to determine depth (e.g., the distance of a target from the LiDAR system) and/or a velocity of a target with respect thereto. Some embodiments of the present disclosure provide improvements to LiDAR technology by omitting components that otherwise may be used in a LiDAR system, thereby improving the speed and accuracy of the LiDAR system, and potentially reducing manufacturing costs associated therewith.

FIG. 1 shows a block diagram depicting a LiDAR system, according to some embodiments of the present disclosure.

Referring to FIG. 1, a LiDAR system 100 includes a light source 110, a mirror 115, a scanner 120, a receiver 140, and a controller 150. The LiDAR system 100 may be referred to as a laser ranging system, a laser radar system, or a laser detection and ranging system.

In some embodiments, the LiDAR system 100 may be configured to sense, identify, or determine distances to one or more targets 130 within a field of regard. As an example, the LiDAR system 100 may determine a distance to a target 130, where all or part of the target 130 is contained within a field of regard (FOR) of the LiDAR system 100. All or part of the target 130 being contained within a FOR of the LiDAR system 100 may refer to the FOR overlapping, encompassing, or enclosing at least a portion of the target 130. In some embodiments, target 130 may include all or part of an object that is moving or stationary relative to LiDAR system 100.

The light source 110 may correspond to a laser for producing an output beam 125 having an operating wavelength (e.g., a wavelength in the electromagnetic spectrum). The output beam 125 may be referred to as an optical signal, a laser beam, a light beam, an optical beam, an emitted beam, an emitted light, or simply a beam. In some embodiments, the LiDAR system 100 is a frequency-modulated continuous-wave (FMCW) LiDAR system. Accordingly, the output beam 125 may be an FMCW laser, although it should be noted that the output beam 125 may be pulsed or otherwise modulated in other embodiments. The output beam 125 may be directed toward the target 130 that is a distance D from the LiDAR system 100. Before being directed to the target 130, the output beam 125 may pass through, or by, the mirror 115 (e.g., the mirror 115 may include a hole, slot, or aperture through which the output beam 125 passes).

After passing through or by the mirror 115, the output beam 125 may also pass through the scanner 120. The scanner 120 may be configured to scan the output beam 125 across an area of interest (e.g., the FOR) of the LiDAR system 100. The scanner 120 may include one or more scanning mirrors configured to pivot, rotate, oscillate, or move in an angular manner about one or more rotation axes. Accordingly, the output beam 125 may be reflected by a scanning mirror, and as the scanning mirror pivots or rotates, the reflected the output beam 125 may be scanned in a corresponding angular manner. For example, a scanning mirror may be configured to periodically pivot back and forth, thereby causing the output beam 125 to scan back and forth.

After passing though the scanner 120, once the output beam 125 reaches the target 130, the target 130 may scatter or otherwise reflect at least a portion of the light of the output beam 125, and some of the scattered or reflected light may be returned toward the LiDAR system 100 as one or more input beams 135 as a received optical signal. Generally, a relatively small fraction of the light from the output beam 125 is returned to the LiDAR system 100 as the input beam 135. The input beam 135 may then return while passing through the scanner 120, and may be then reflected by the mirror 115 to be directed to the receiver 140.

In addition to the mirror 115, the LiDAR system 100 may include one or more optical components (e.g., lenses, mirrors, or filters) that are configured to reflect, focus, filter, shape, modify, steer, direct, collimate, or combine light produced by, or received by, the LiDAR system 100 (e.g., to steer or focus the output beam 125 or the input beam 135). As an example, the LiDAR system 100 may include one or more lenses to focus the input beam 135 onto a photodetector of the receiver 140. In some embodiments, the mirror 115 may provide for the output beam 125 and the input beam 135 to be substantially coaxial so that the two beams travel along approximately the same optical path (e.g., to travel substantially parallel to one another and in opposite directions). Accordingly, the mirror 115 and other corresponding components may direct the input beam 135 toward the receiver 140.

The receiver 140 may be referred to as a photoreceiver, optical receiver, optical sensor, detector, photodetector, or optical detector. The receiver 140 may include one or more avalanche photodiodes (APDs), single-photon avalanche diodes (SPADs), PN photodiodes (PD), and/or PIN photodiodes (e.g., a balanced PIN PD 340, as shown in FIG. 3). The receiver 140 may include electronic circuitry that performs signal modification and analysis. The receiver 140 may include a transimpedance amplifier (TIA) (e.g., the TIA 265, 365 described below with respect to FIGS. 2 and 3) that converts a received photocurrent, which is produced in response to a received optical signal, into a voltage signal. The voltage signal may be used to determine one or more optical characteristics of the input beam 135, and may be used to produce a digital output signal/electrical signal 145 to be sent to the controller 150 for processing or analysis (e.g., to determine a time-of-flight value corresponding to a received optical pulse).

Accordingly, after being reflected by the mirror 115, the receiver 140 may receive and detect photons from the input beam 135. The receiver 140 may then produce and output an electrical current or voltage pulse as an electrical signal 145 that represents the input beam 135, and may send the electrical signal 145 to the controller 150 (e.g., a controller that may be part of, or that may include, the ROIC 250, 350 described below with respect to FIGS. 2 and 3).

The controller 150 may include a processor, computing system, or other suitable circuitry, and may be configured to analyze one or more characteristics of the electrical signal 145 from the receiver 140 to determine one or more characteristics of the target 130, such as a distance of, or velocity of, the target with respect to the LiDAR system 100. This may be done, for example, by analyzing a time of flight of the light that is common to the transmitted output beam 125 and the received input beam 135.

A time of flight T represents a round-trip time of flight for an emitted beam or pulse of light to travel from the LiDAR system 100 to the target 130, and then from the target 130 back to the LiDAR system 100. The time of flight T may be used to calculate the distance/range/depth D from the target 130 to the LiDAR system 100, where the distance D may be expressed as $D=c*T/2$, where c is the speed of light.

The controller 150 may also be electrically or communicatively coupled to the light source 110, the mirror 115, and the scanner 120. The controller 150 may receive electrical trigger pulses or edges as a result of the light source 110, where each pulse or edge corresponds to the emission of an optical pulse by the light source 110. The controller 150 may also control the light source 110 to cause the light source 110 to produce and/or adjust the output beam 125. As described further below, the controller 150 may determine a time-of-flight value for an optical pulse based on timing information associated with when the output beam 125 was emitted by the light source 110, and when the input beam 135 was detected by the receiver 140. Accordingly, the controller 150 may include circuitry that performs signal amplification, sampling, filtering, signal conditioning, analog-to-digital conversion, time-to-digital conversion, pulse detection, threshold detection, rising-edge detection, or falling-edge detection.

In some embodiments, one or more LiDAR systems 100 may be integrated into a vehicle, for example, as part of an advanced driver assistance system (ADAS) to assist a driver of the vehicle in operating the vehicle, or as part of an autonomous vehicle driving system. For example, the LiDAR system 100 may be part of an ADAS that provides information or feedback to a driver (e.g., to alert the driver to potential problems or hazards), or that automatically controls one or more functions of the vehicle (e.g., by controlling a braking system or a steering system) to avoid collisions or accidents. The LiDAR system 100 may provide information about the surrounding environment to a driving system of an autonomous vehicle. An autonomous-vehicle driving system may be configured to guide the autonomous vehicle through an environment surrounding the vehicle, and may include one or more computing systems that receive information from the LiDAR system 100 about the surrounding environment, that analyze the received information, and that provide control signals to the vehicle's driving systems and actuators (e.g., steering wheel, accelerator, brake, or turn signal).

Figure 2:
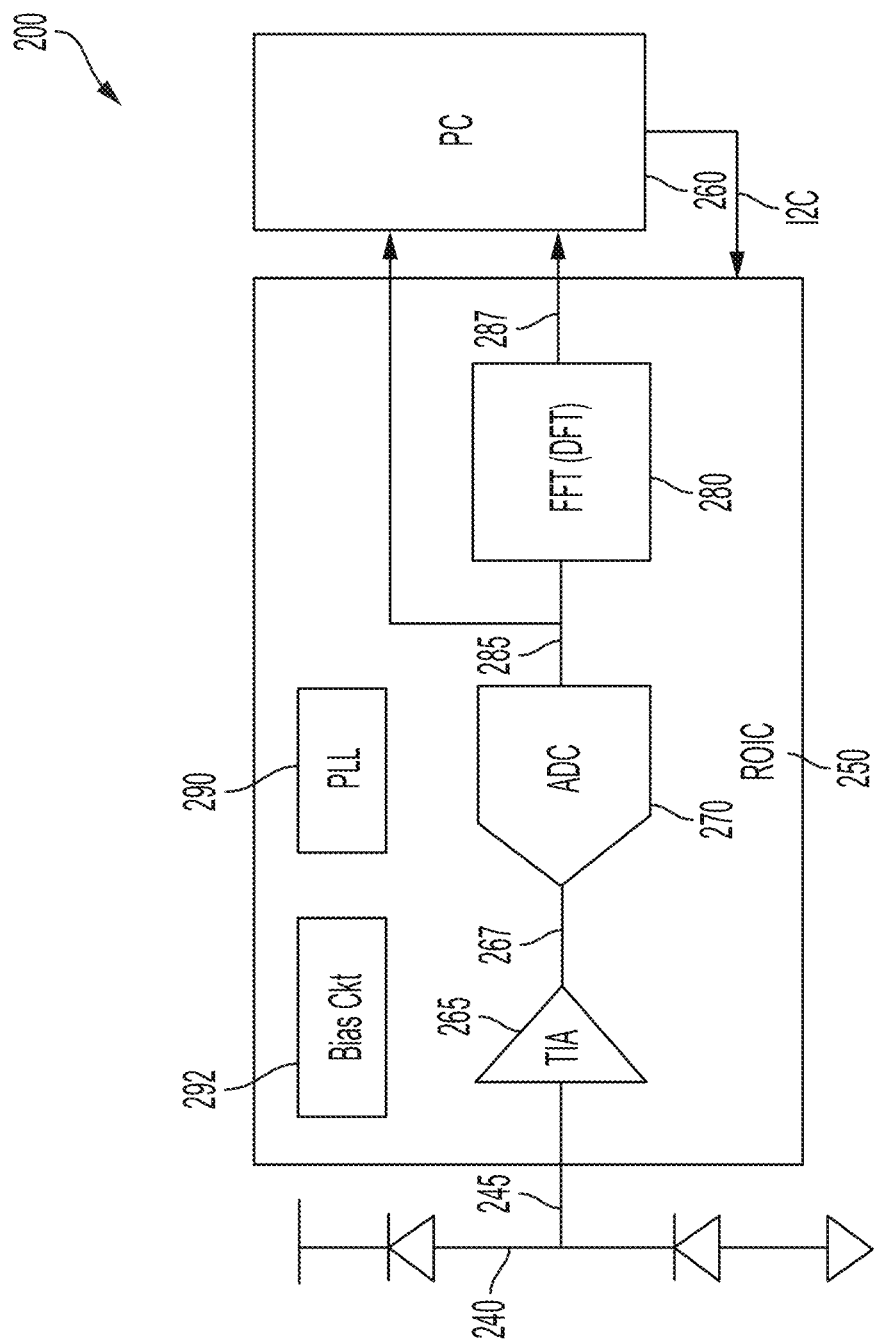
FIG. 2 shows a block diagram depicting a readout architecture of a frequency-modulated continuous wave (FMCW) LiDAR system.
Figure 3:
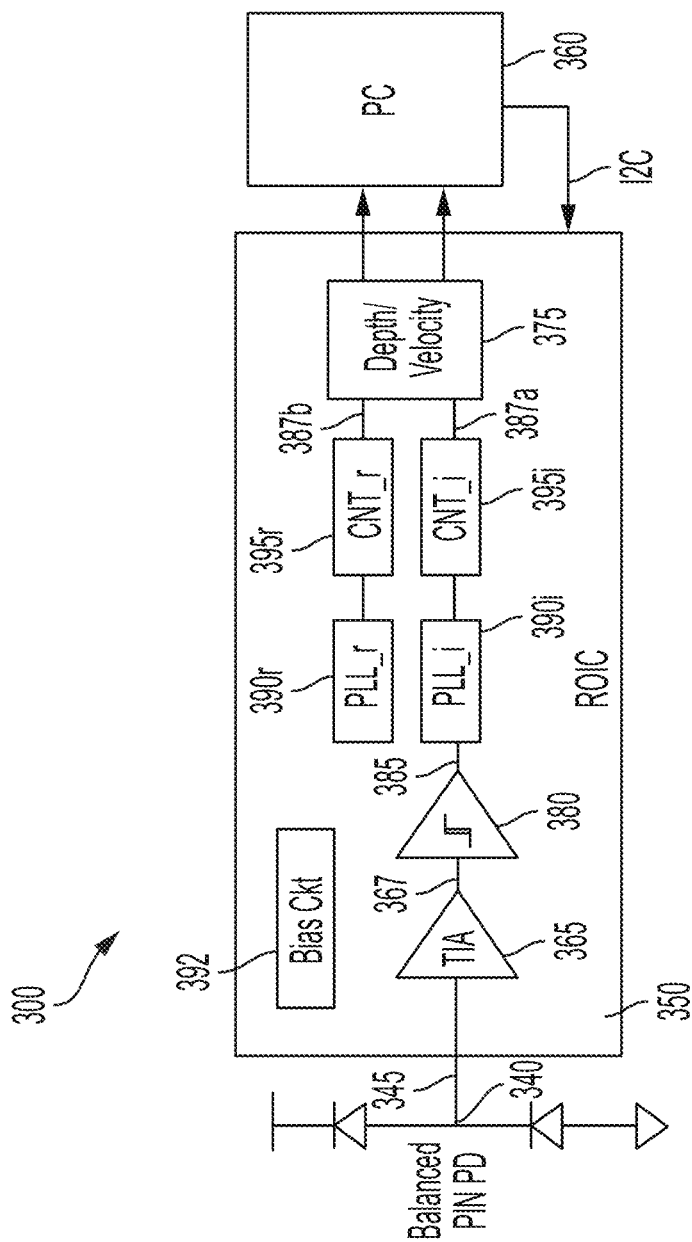
FIG. 3 shows a block diagram depicting a readout architecture of a frequency-modulated continuous wave (FMCW) LiDAR system, according to some embodiments of the present disclosure.

FIG. 2 shows a block diagram depicting a readout architecture of a frequency-modulated continuous wave (FMCW) LiDAR system.

Referring to FIG. 2, the readout architecture 200 of a FMCW LiDAR system (e.g., the LiDAR system 100 of FIG. 1) may include a balanced PIN PD 240 that is implemented as a receiver (e.g., the receiver 140 of FIG. 1) of the LiDAR system, and also may include a readout integrated circuit (ROIC) 250 that is implemented as a controller (e.g., the controller 150 of FIG. 1) of the LiDAR system. The ROIC 250 may be used in connection with a memory (PC) 260. The ROIC 250 may include, in relevant part, a TIA 265, an analog-to-digital controller (ADC) block 270 (e.g., an ultra-high speed high resolution ADC block 270), a Fast Fourier Transform (FFT) block 280 (e.g., a 2-dimensional FFT block), and a phase-locked loop (PLL) block 290.

The balanced PIN PD 240 may receive photons corresponding to an input beam (e.g., the input beam 135 of FIG. 1), and may then convert the photons to current as a signal 245 (e.g., the electrical signal 145 of FIG. 1). Then, the TIA 265 may receive the signal 245, and may transform the current of the signal 245 to a voltage signal (e.g., a TIA signal 267) to be sent to the ADC block 270. Then the ADC block 270 transforms the TIA signal 267 received from the TIA 265 into data flow (e.g., a data signal 285), such that each pixel, or voxel (e.g., a single sample, or data point, on a regularly spaced, three-dimensional grid), detected by the balanced PIN PD 240 may be converted to one or more corresponding data values. Thereafter, the FFT block 280 may run a transform (e.g., an FFT) on the data values of the data signal 285 received from the ADC block 270 to calculate depth information corresponding to the target reflecting or scattering the input beam 135. Finally, depth values indicated in a depth signal 287 from the FFT block 280, along with the data values of the data signal 285 from the ADC block 270, are sent to the memory 260 via two respective lines to the memory 260 from the ADC block 270 and the FFT block 280, thereby enabling calculation of both depth and velocity of the target (e.g., the target 130 of FIG. 1) by using the data signal 285 and the depth signal 287.

High-resolution and high-quality range/depth/distance information may be used by advanced driver assistance system (ADAS) and autonomous driving applications to enable the LiDAR system to "see" further (e.g., to have a longer target detection range), and to enable the LiDAR system to detect or recognize the target more quickly and easily, thereby reducing risk associated with the vehicle employing the LiDAR system either hitting or avoiding the target(s). Further, a low-power-operation LiDAR system may be implemented with an ADAS or autonomous driving system. Accordingly, specifications of the ROIC 250 may consider receiver bandwidth (e.g., on the order of a few hundred MHz or more), ADC resolution and detection capabilities, low noise (e.g., a signal-to-noise ratio (SNR) of 12 dB or more for signal power, and/or a low-noise amplifier (LNA) used as the TIA), power consumption, performance of direct Fourier transforms (DFT) at chip level, and other RF processes.

However, target analyses in a 3D system generally consume a relatively large amount of power. Furthermore, a LiDAR system that is able to calculate target depth using a direct time-of-flight (dToF) method in conjunction with a single photo avalanche diode (SPAD) as the receiver may have difficulty due to the presence of various sources of ambient noise. Accordingly, implementation of the readout architecture 200 of FIG. 2 may present obstacles associated with the ADC block 270 and the FFT block 280.

For example, the 2D FFT block 280 may require a relatively large amount of space on the ROIC 250, and may consume relatively large amounts power for several frames to enable detection of depth and velocity information, noting that the readout architecture 200 in the FMCW LiDAR system may concurrently determine depth and velocity by using the 2D FFT block 280. Further, there may be lag associated with operation of the FFT block 280 when determining depth and velocity information.

As another example, the ADC block 270 may operate on the order of GHz (e.g., may have a sampling speed of a few GHz) to effectuate moderate-to-high resolution, and the readout architecture 200 may seek to separate signal noise and crosstalk associated with other blocks of the ROIC 250. This may be achieved by a high-speed, low-jitter phase-locked loop (PLL) block 290 and a highly sensitive bias circuit 292 to support high speed operation of the ADC block 270 (e.g., the PLL block 290 may be used as a clock for the ADC block 270 and the FFT block 280, and may operate on the order of GHz). As a result, the readout architecture 200 might not effectively integrate with an Optical PLL block (OPLL) due to a high level of sensitivity of each block.

Accordingly, as described below with respect to FIGS. 3 and 4, there may be benefit associated with a novel readout architecture that addresses some of the above issues and limitations of the readout architecture 200 of FIG. 2.

FIG. 3 shows a block diagram depicting a readout architecture of a frequency-modulated continuous wave (FMCW) LiDAR system, according to some embodiments of the present disclosure.

Referring to FIG. 3, various issues associated with the readout architecture of a LiDAR system (e.g., the readout architecture 200 of FIG. 2) may be addressed or eliminated. For example, ambient noise associated with the readout architecture 200 of FIG. 2 can be effectively eliminated by using a modulated signal (e.g., a FMCW signal) in accordance with an FMCW LiDAR system of embodiments of the present disclosure (e.g., the LiDAR system 100) by removing interference otherwise caused by other LiDAR systems and/or other light sources. This may be achieved by providing a low power readout architecture 300 that omits the high-speed ADC block 270 and the 2D FFT block 280 of the readout architecture 200 of FIG. 2, which are generally blocks that are relatively sensitive to noise, and by replacing the omitted blocks with a comparator 380 and one or more counters 395.

The readout architecture 300 of a LiDAR system may include, in relevant part, a balanced PIN PD 340 as a receiver (e.g., the receiver 140 of FIG. 1), a ROIC 350 including a TIA 365, the comparator 380, a primary PLL block 390$i$, a reference PLL block 390$r$, a primary counter block 395$i$, a reference counter block 395$r$, a depth and/or depth/velocity block 375 for calculating depth and or velocity, and a memory (PC) 360. Unlike the ROIC 250 of FIG. 2, the ROIC 350 of the present example omits overly sensitive blocks (e.g., the ADC block 270 and the FFT block 280), while still effectively calculating depth and velocity of the target.

The LiDAR system of the present example may output an output beam (e.g., the output beam 125 of FIG. 1) by using a chirping signal that varies the frequency of the output beam 125. The target (e.g., the target 130 of FIG. 1) may then scatter or reflect the output beam 125 to thereby return an input beam (e.g., the input beam 135 of FIG. 1) to the LiDAR system (e.g., to the balanced PIN PD 340).

Accordingly, the balanced PIN PD 340 may detect photons of the input beam 135 as a chirping signal. The balanced PIN PD 340 may then convert the photons into a current to deliver a signal (e.g., current as an electrical signal, or a digital output signal) 345 to the ROIC 350, which may operate, either by itself or in conjunction with the frame memory 360, as the controller 150 of FIG. 1. The electrical signal 345 from the balanced PIN PD 340 may be thought of as having a beat frequency corresponding to the chirping frequency of the input beam 135. The electrical signal 345 may then be received directly by the TIA 365, although it should be noted that, in other embodiments, the readout architecture 300 may include optical mixers between the balanced PIN PD 340 and the TIA 365.

The TIA 365 is a current-to-voltage converter, and may be used with one or more operational amplifiers. The TIA 365 may be used to amplify the current output, which corresponds to the received electrical signal 345, to a usable voltage (e.g., to a suitable voltage to be used by the comparator 380). The TIA 365 may be used because the balanced PIN PD 340 may have a current response that is more linear than the voltage response (e.g., the current response of the balanced PIN PD 340 may be about 1% nonlinearity or better over a wide range of light input). The TIA 365 presents a low impedance to the balanced PIN PD 340, and may isolate the balanced PIN PD 340 from the output voltage of the TIA 365. In some embodiments, the TIA 365 may be a large-valued feedback resistor. The gain, bandwidth, input offset current, and input offset voltages of the TIA 365 may vary depending on the type of receiver (e.g., the receiver 140 of FIG. 1) used in conjunction therewith.

Accordingly, the TIA 365 may receive the electrical signal 345, and may transform the electrical signal 345 to a voltage. It should be noted that, unlike the TIA 265 of FIG. 2, the TIA 365 of the present example does not require a low-noise amplifier, as the ROIC 350 is able to effectively separate noise from the signal various signals associated therewith. After transforming the electrical signal 345 to a voltage and/or amplifying the current output of the electrical signal 345, the TIA 365 may deliver a TIA signal 367 to the comparator 380 (e.g., as a relatively small analog signal).

The comparator 380 may then transform the TIA signal 367 from the TIA 365 to a pulse signal 385. The pulse signal 385 from the comparator 380 is then sent along as data effective for signal processing. Then, the data indicated by the pulse signal 385 may be sent to the primary PLL block 390i, which may be supported by a bias circuit 392.

Thereafter, the primary PLL block 390i and/or the primary counter block 395i, which may be implemented as a part of an arithmetic logic unit (ALU), may count the frequency of the pulse signal 385, and may send the count along as a count signal 387a to the depth/velocity block 375. The depth/velocity block 375 is capable of simple multiplication and division to enable calculation of the depth and/or velocity of the target with respect to the LiDAR system based on the count signal 387a.

Accordingly, the primary PLL block 390i, in conjunction with the primary counter block 395i and the depth/velocity block 375, may be used to multiply a beat frequency to enable calculation of the depth of the target (e.g., the target 130 of FIG. 1) using a direct time-of-flight (dToF) method, as discussed further below. However, it should be noted that, in other embodiments, the primary PLL block 390i may be omitted, and the pulse signal 385 output by the comparator 380 may be sent to the primary counter block 395i and may be used, by itself, to produce a count for a given timeframe.

For example, by counting the beat frequency of the pulse signal 385, the count frequency may be converted to a digital signal (e.g., by using a frequency-to-digital (F2D) converter) to determine depth/range/distance information associated with the target, wherein a smaller distance between the input frequency of the input beam 135 and the output frequency of the output beam 125 corresponds to a longer delay, thereby resulting in a high frequency and a higher count. Accordingly, by counting the beat pulse of the pulse signal 385 in the time domain, a distance from the LiDAR system to the target can be determined.

In some embodiments, the readout architecture 300 may be suitable for high-resolution depth information. Accordingly, a count associated with the beat frequency of the pulse signal 385 may be longer, due to the increased distance of the target from the LiDAR system. Accordingly, according to some embodiments, a reference target at a reference distance that is associated with a reference count may be used to calculate depth information associated with the target.

For example, the reference PLL block 390r (e.g., in conjunction with the reference counter block 395r) may be used to count a reference target frequency (e.g., a frequency of a pulse signal associated with a reference target at a reference distance), and may send the count to the depth/velocity block 375 as a reference count signal 387b. Thereafter, depth information associated with the target can be calculated as shown in Equation 1 below.

$$D = RD * CNT\_i / CNT\_r \qquad \text{Equation 1}$$

Where D is the calculated distance of the target, RD is the reference distance of the reference target, CNT_i is the count determined by the primary PLL block 390i and/or the primary counter block 395i (e.g., count signal 387a) in association with the distance of the target, and CNT_r is the count determined by the reference PLL block 390r and/or the reference counter block 395r (e.g., reference count signal 387b) in association with the reference distance of the reference target.

Accordingly, resolution, accuracy, and noise of the readout architecture 300 may depend on a speed of the primary PLL block 390i and on a length of a counting time, wherein a longer counting time enables a more accurate and higher resolution readout architecture.

Furthermore, a single frame memory 360 may be used to calculate velocity information. For example, the depth/velocity block 375 may deliver depth information in a signal 393 delivered to the frame memory 360. Then, the frame memory 360 can store the depth information, and can thereafter calculate velocity of the target using the depth information corresponding to a distance to the target at a first time, new depth information corresponding to a distance to the target at a second time, and the time difference between the first time and the second time. It should be noted that the primary PLL block 390i, the reference PLL block 390r, the primary counter block 395i, the reference counter block 395r, the depth/velocity block 375, and/or the frame memory 360 may be implemented by an ALU, although the present disclosure is not limited thereto.

For example, velocity information associated with the target can be calculated as shown in Equation 2 below.

$$V = \text{avg}[(\text{distance}\_i+1 - \text{distance}\_i)/\text{tunit}], \text{ or } V = (\text{distance}\_i+1 - \text{distance}\_i) \qquad \text{Equation 2}$$

Where V is velocity, distance_i is the distance of the target at a first time, distance_i+1 is the distance of the target at a second time, and "tunit" depends on a timing of the chirping of the chirped signal corresponding to the input beam.

Figure 4:
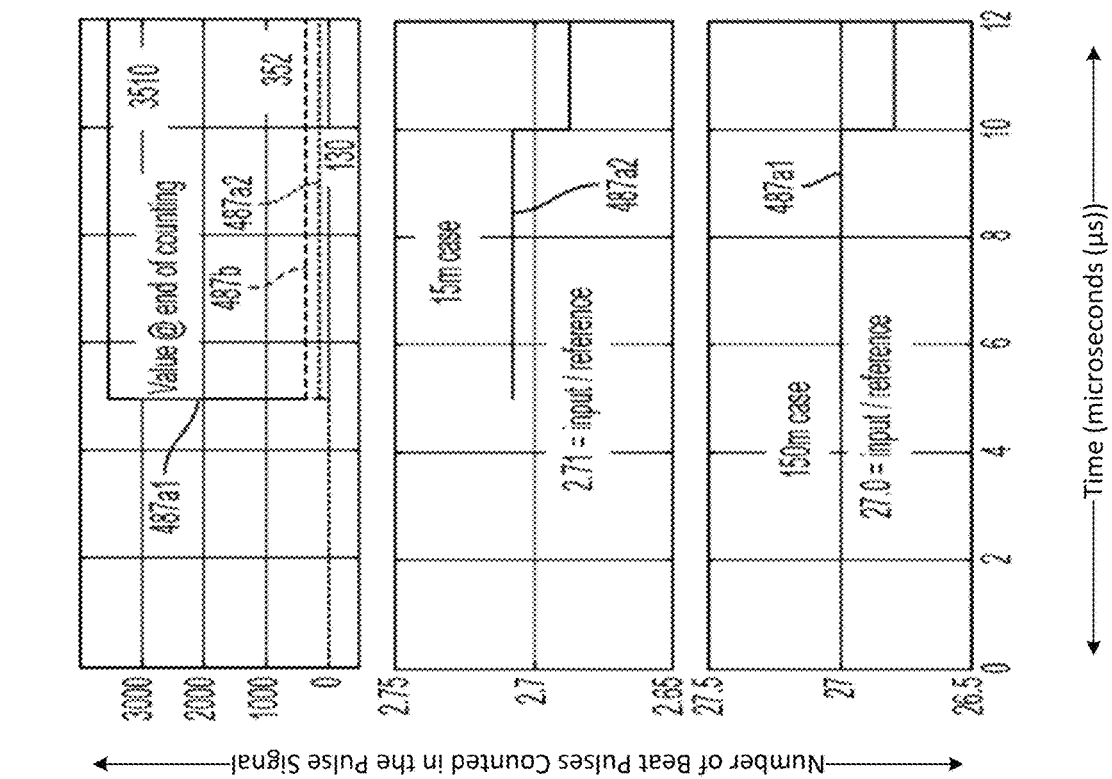
FIG. 4 shows examples of various signals of a simulated ROIC of a readout architecture corresponding to a target at varying distances, according to some embodiments of the present disclosure.
Figure 4:
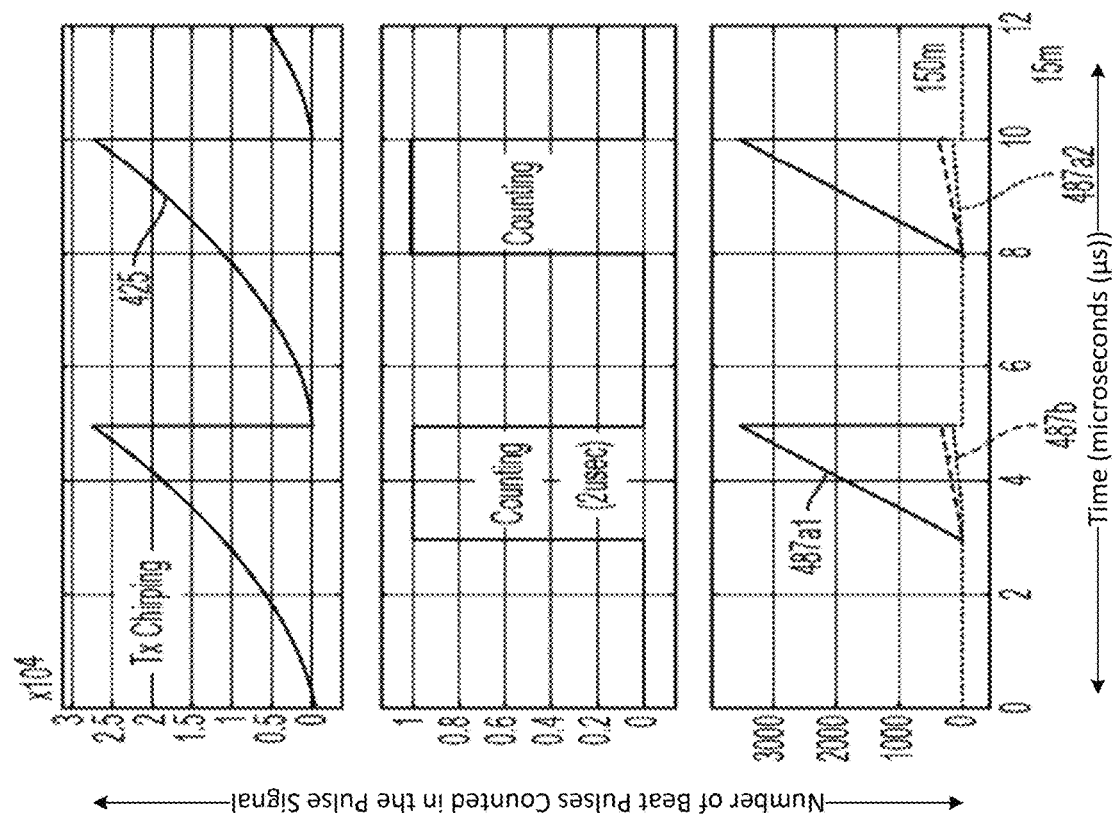

FIG. 4 shows examples of various signals of a simulated ROIC of a readout architecture corresponding to a target at varying distances, according to some embodiments of the present disclosure.

Referring to FIG. 4, the ROIC may correspond to the ROIC 350 of FIG. 3. For example, a transmitted Tx Chirping signal 425 may correspond to a signal of an output beam (e.g., the output beam 125 of FIG. 1). The Tx Chirping signal 425 may have a frequency of about once every 2 microseconds, as indicated by the count, although the present disclosure is not limited thereto. Accordingly, the primary PLL block 390i and/or the primary counter block 395i may produce a first signal 487a1 corresponding to a first target distance of 150 meters, and may produce a second signal 487a2 corresponding to a second target distance of 15 meters, while the reference PLL block 390r and/or the reference counter block 395r may produce a reference signal 487b corresponding to a reference distance of a reference target. As shown in FIG. 4, a count value corresponding to the first signal 487a1 may be about 3510, the count value corresponding to the second signal 487a2 may be about 130, and the count value of the reference signal 487b may be about 352.

Figure 5:
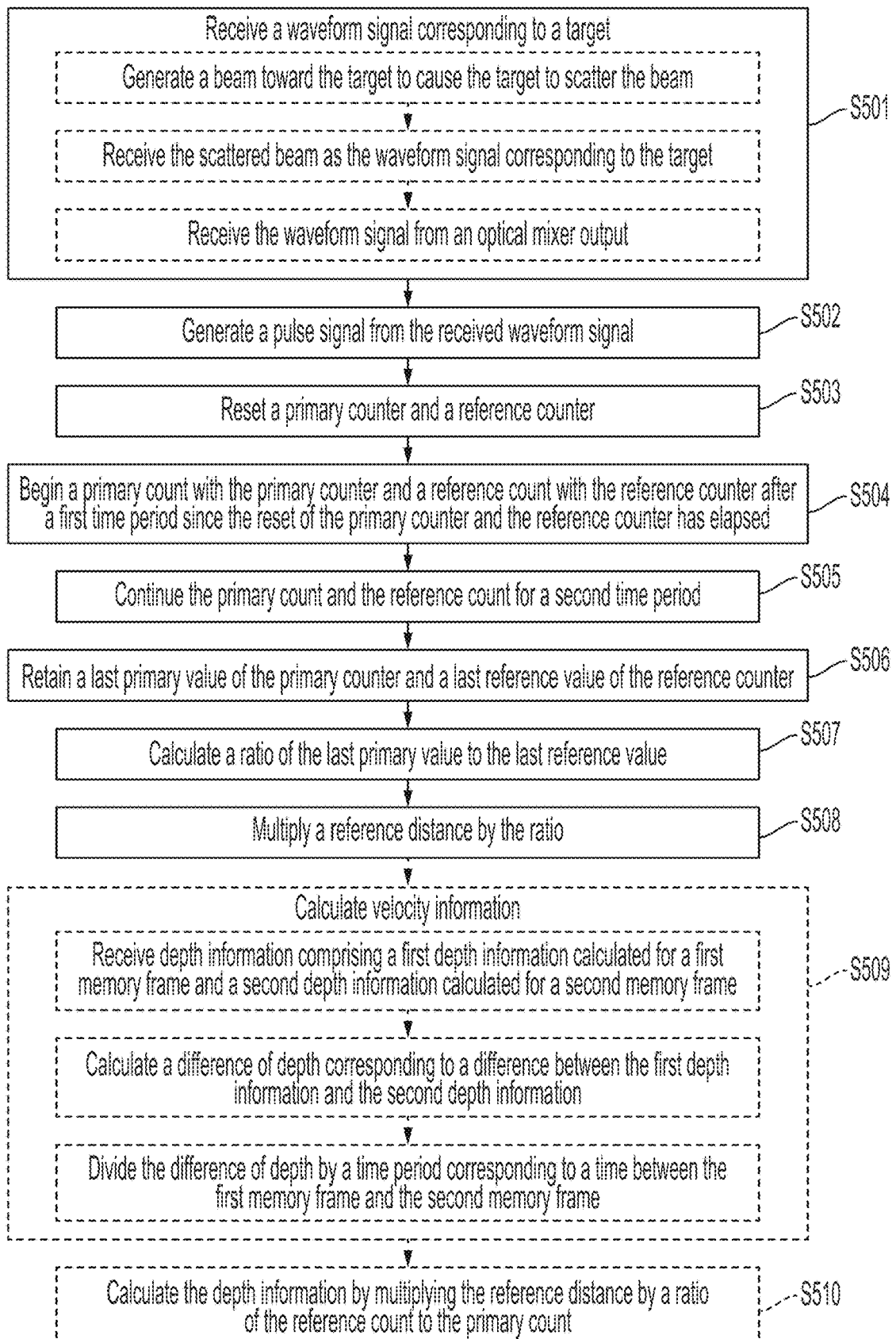
FIG. 5 shows a flow chart depicting a method of determining a distance of a target from a LiDAR system, according to some embodiments of the present disclosure.

FIG. 5 shows a flow chart depicting a method of determining a distance of a target from a LiDAR system, according to some embodiments of the present disclosure.

Referring to FIG. 5, at S501 a LiDAR system (e.g., the LiDAR system 100 of FIG. 1) may receive a waveform signal corresponding to a target (e.g., the target 130 of FIG. 1). For example, the balanced PIN PD 340 shown in FIG. 3 may receive the waveform signal. According to some embodiments, the LiDAR system may receive the waveform signal by generating a beam toward the target to cause the target to scatter the beam (e.g., may generate the output beam 125 by using the light source 110 and the scanner 120 of FIG. 1), by receiving the scattered beam as the waveform signal corresponding to the target (e.g., may receive the input beam 135 by using the scanner 120, the mirror 115, and the receiver 140 of FIG. 1), and by receiving the waveform signal from an optical mixer output.

At S502, the LiDAR system may generate a pulse signal from the received waveform signal (e.g., the TIA 365 and/or the comparator 380 may generated the pulse signal 385, as shown in FIG. 3).

At S503, the LiDAR system may reset a primary counter and a reference counter (e.g., the primary counter block 395i and the reference counter block 395r of FIG. 3 may be reset).

At S504, the LiDAR system may begin a primary count with the primary counter and a reference count with the reference counter after a first time period since the reset of the primary counter and the reference counter has elapsed. The first time period may correspond to a detection range.

At S505, the LiDAR system may continue the primary count and the reference count for a second time period. The second time period may correspond to a flexible programmed time period.

At S506, the LiDAR system may retain a last primary value of the primary counter and a last reference value of the reference counter (e.g., by using the frame memory 360 of FIG. 3).

At S507, the LiDAR system may calculate a ratio of the last primary value to the last reference value (e.g., by using the depth and/or depth/velocity block 375 of FIG. 3).

At S508, the LiDAR system may multiply a reference distance by the ratio of the last primary value to the last reference value (e.g., by using the depth and/or depth/velocity block 375 of FIG. 3).

According to some embodiments, at S509, the LiDAR system may calculate velocity information (e.g., by using the depth and/or depth/velocity block 375 and the frame memory 360 of FIG. 3), by receiving depth information comprising a first depth information calculated for a first memory frame and a second depth information calculated for a second memory frame, calculating a difference of depth corresponding to a difference between the first depth information and the second depth information, and dividing the difference of depth by a time period corresponding to a time between the first memory frame and the second memory frame.

According to some embodiments, at S510, the LiDAR system may calculate the depth information by multiplying the reference distance by a ratio of the reference count to the primary count (e.g., by using the depth and/or depth/velocity block 375 of FIG. 3).

The ROIC of various embodiments of the present disclosure (e.g., the ROIC 350 of the readout architecture 300 of FIG. 3), as described above, may be integrated with an OPLL at a same chip die. Accordingly, a size of the LiDAR system employing the ROIC of the disclosed embodiments may be reduced. Further, the ROIC of the disclosed embodiments enables the readout architecture to achieve ultra-low power, high-speed operation, and can extract depth and velocity information without unacceptable system delay. Further, depth information may be obtained by using a relatively simple counter(s) while omitting use of a relatively complex FFT block (e.g., the FFT block 280 of the ROIC 250 of FIG. 2). The readout architecture of the disclosed embodiments is also able to calculate velocity information by using the relatively simple counter(s) and a relatively small frame memory that is both able to store the depth information, and able to determine a difference of respective depths between two frames to determine velocity information.

Thus, embodiments of the present disclosure provide a readout architecture used in conjunction with a LiDAR system to improve size, speed, and accuracy of the LiDAR system.

While the present disclosure has been particularly shown and described with reference to some example embodiments thereof, it will be understood by those of ordinary skill in the art that various changes in form and details may be made therein without departing from the spirit and scope of the present disclosure as set forth in the following claims and their equivalents.

What is claimed is:

1. A readout integrated circuit of a frequency-modulated continuous wave (FMCW) LiDAR system, the readout integrated circuit comprising:
  a transimpedance amplifier configured to:
    receive an optical signal of an optical mixer output from a balanced PIN photo diode;
    convert the received optical signal into a current signal comprising a mixed signal of high and low frequencies; and
    convert the current signal into a voltage signal comprising a low frequency sinusoidal waveform after filtering a high frequency;
  a comparator configured to:
    receive the voltage signal from the transimpedance amplifier; and
    generate a pulse signal from the voltage signal;
  a primary counter configured to:
    receive a primary signal based on the pulse signal generated by the comparator; and
    count a number of pulses of the primary signal during a certain time period to generate primary counter data;
  a reference counter configured to:
    receive a reference signal having a reference frequency corresponding to a reference distance; and
    count a number of pulses of the reference signal during a time period to generate reference counter data; and
  an arithmetic logic unit configured to:
    receive the primary counter data and the reference counter data; and
    calculate depth information, which indicates a distance of a target based on the primary counter data and the reference counter data, by multiplying the reference distance by a ratio of the reference counter data to the primary counter data.

2. The readout integrated circuit of claim 1, further comprising:
a primary phase-locked loop (PLL) configured to:
receive the pulse signal from the comparator; and
modulate a frequency of the pulse signal to generate the primary signal; and
a reference phase-locked loop configured to modulate a reference PLL signal to generate the reference signal.

3. The readout integrated circuit of claim 2, wherein the comparator is further configured to compare the primary signal and the reference signal.

4. The readout integrated circuit of claim 1, further comprising a frame memory configured to:
receive the primary counter data; and
receive the depth information, or velocity information, from the arithmetic logic unit.

5. The readout integrated circuit of claim 4, wherein the arithmetic logic unit is further configured to calculate velocity information by:
receiving, from the frame memory, the depth information, the depth information comprising a first depth information calculated for a first memory frame and a second depth information calculated for a second memory frame;
calculating a difference of depth corresponding to a difference between the first depth information and the second depth information; and
dividing the difference of depth by a time period corresponding to a time between the first memory frame and the second memory frame.

6. The readout integrated circuit of claim 1, wherein the comparator is further configured to compare the primary counter data and the reference counter data.

7. A method to determine a distance or a velocity of an object, the method comprising:
receiving a waveform signal corresponding to a target;
generating a pulse signal from the received waveform signal;
resetting a primary counter and a reference counter;
beginning a primary count with the primary counter and a reference count with the reference counter after a first time period since the resetting of the primary counter and the reference counter has elapsed;
continuing the primary count and the reference count for a second time period;
retaining a last primary value of the primary counter and a last reference value of the reference counter;
calculating a ratio of the last primary value to the last reference value; and
multiplying a reference distance by the ratio.

8. The method of claim 7, further comprising receiving the waveform signal from an optical mixer output.

9. The method of claim 7, wherein the first time period corresponds to a detection range.

10. The method of claim 7, wherein the second time period corresponds to a flexible programmed time period.

11. The method of claim 7, further comprising generating a beam toward the target to cause the target to scatter the beam, and receiving the scattered beam as the waveform signal corresponding to the target.

12. The method of claim 7, further comprising calculating velocity information by:
receiving depth information comprising a first depth information calculated for a first memory frame and a second depth information calculated for a second memory frame;
calculating a difference of depth corresponding to a difference between the first depth information and the second depth information; and
dividing the difference of depth by a time period corresponding to a time between the first memory frame and the second memory frame.

13. The method of claim 12, further comprising calculating the depth information by multiplying the reference distance by a ratio of the reference count to the primary count.

14. A non-transitory computer readable medium implemented on a readout integrated circuit of a frequency-modulated continuous wave (FMCW) LiDAR system, the non-transitory computer readable medium having computer code that, when executed on a processor, implements a method of determining a distance or a velocity of an object, the method comprising:
receiving a waveform signal corresponding to a target;
generating a pulse signal from the received waveform signal;
resetting a primary counter and a reference counter;
beginning a primary count with the primary counter and a reference count with the reference counter after a first time period since the resetting has elapsed;
continuing the primary count and the reference count for a second time period;
retaining a last primary value of the primary counter and a last reference value of the reference counter;
calculating a ratio of the last primary value to the last reference value; and
multiplying a reference distance by the ratio.

15. The non-transitory computer readable medium of claim 14, wherein the computer code, when executed on the processor, further implements the method of determining the distance or the velocity of the object by receiving the waveform signal from an optical mixer output.

16. The non-transitory computer readable medium of claim 14, wherein the first time period corresponds to a detection range, and
wherein the second time period corresponds to a flexible programmed time period.

17. The non-transitory computer readable medium of claim 14, wherein the computer code, when executed on the processor, further implements the method of determining the distance or the velocity of the object by generating a beam toward the target to cause the target to scatter the beam, and receiving the scattered beam as the waveform signal corresponding to the target.

18. The non-transitory computer readable medium of claim 14, wherein the computer code, when executed on the processor, further implements the method of determining the distance or the velocity of the object by calculating velocity information by:
receiving depth information comprising a first depth information calculated for a first memory frame and a second depth information calculated for a second memory frame;
calculating a difference of depth corresponding to a difference between the first depth information and the second depth information; and
dividing the difference of depth by a time period corresponding to a time between the first memory frame and the second memory frame.

19. The non-transitory computer readable medium of claim 18, wherein the computer code, when executed on the processor, further implements the method of determining the distance or the velocity of the object by calculating the depth information by multiplying the reference distance by a ratio of the reference counter output data to the primary counter output data.

\* \* \* \* \*